US005660508A

United States Patent [19]

Schneider

[11] Patent Number: 5,660,508

[45] Date of Patent: Aug. 26, 1997

[54] PORTABLE RADIAL DRILL PRESS

[76] Inventor: Robert A. Schneider, 741 John St., Bensenville, Ill. 60106

[21] Appl. No.: 632,104

[22] Filed: Apr. 15, 1996

[51] Int. Cl.[6] .......... B23C 1/06

[52] U.S. Cl. .......... 408/111; 408/712

[58] Field of Search .......... 408/111, 110, 408/712, 100, 99

[56] References Cited

U.S. PATENT DOCUMENTS

| | | | |
|---|---|---|---|
| 4,582,105 | 4/1986 | Wolff | 408/712 X |
| 4,655,649 | 4/1987 | Itzov et al. | 408/712 X |
| 4,923,341 | 5/1990 | Cameron | 408/712 X |
| 4,932,814 | 6/1990 | York | 408/111 X |
| 5,413,440 | 5/1995 | Willson et al. | 408/111 X |

FOREIGN PATENT DOCUMENTS

| | | | |
|---|---|---|---|
| 2701358 | 7/1978 | Germany | 408/111 |

*Primary Examiner*—Daniel W. Howell
*Assistant Examiner*—Henry W. H. Tsai

[57] ABSTRACT

A portable radial drill press including a base member that has a columnar support with a balance retention member. The columnar support has a first axial bore and a back side with a slit. Included is a traveling block has a rear support with a second axial bore and forked members. A columnar member is positioned within the first axial bore of the base member. The columnar member has a top end that passes into the second axial bore of the traveling block. The columnar member has a bottom portion secured within the first axial bore with a clamping bolt. A left hand feed screw is positioned within the columnar member and engaged by a feed nut screw. The feed nut screw is held about the feed screw by a first bolt and a flat screw. The first bolt passes between the fork members to engage the feed nut screw. The flat screw passes through the rear support to engage the feed nut screw. Lastly, a drill support arm with an elongated opening coupling the traveling block and large opening supporting a hand drill.

2 Claims, 3 Drawing Sheets

FIG. 5
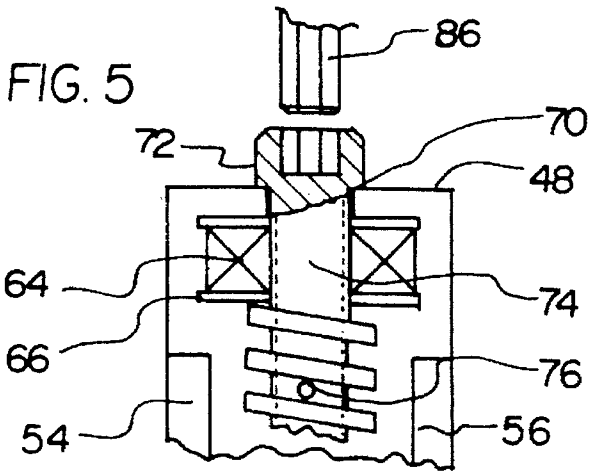
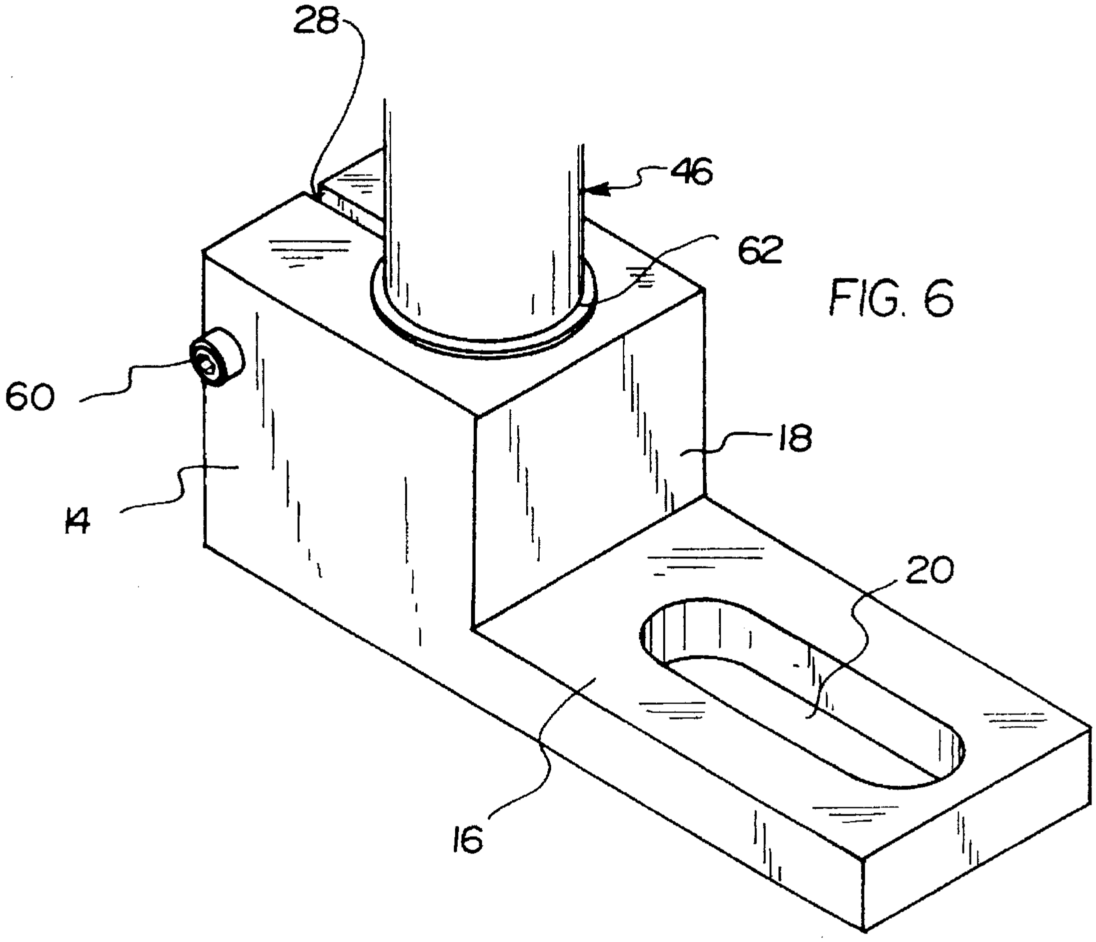
FIG. 6

PORTABLE RADIAL DRILL PRESS

BACKGROUND OF THE INVENTION

1. Field of the Invention

The present invention relates to a portable radial drill press and more particularly pertains to providing an upstanding adjustable support arm that has a two part articulatable drill support structure that extends from the upstanding support arm.

2. Description of the Prior Art

The use of a drill press stand is known in the prior art. More specifically, a drill press stand heretofore devised and utilized for the purpose of supporting hand-held drills are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,160,231 to Miller discloses a press with quick attach tool alignment. U.S. Pat. No. Des. 284,970 to Wolff discloses a hand-drill press stand. U.S. Pat. No. 4,523,882 to Hengesbach discloses a drill press with overhead mount. U.S. Pat. No. 4,484,844 to Williams discloses a horizontal drill press. U.S. Pat. No. 4,466,601 to Raines discloses a holding fixture for a drilling oblique holes. Lastly, U.S. Pat. No. Des. 273,299 to Archeskie discloses an adjustable portable hand drill press holder.

While these devices fulfill their respective, particular objectives and requirements, the aforementioned patents do not describe portable radial drill press that allows a hand-held drill support arm to be adjusted within the traveling block, while the traveling block is adjusted along a feed screw, and the columnar member supporting the traveling block is adjusted with regards to the base member for positioning of the hand-held drill be supported.

In this respect, the portable radial drill press according to the present invention substantially departs from the conventional concepts and designs of the prior art, and in doing so provides an apparatus primarily developed for the purpose of providing an upstanding adjustable support arm that has a two part articulatable drill support structure that extends from the upstanding support arm.

Therefore, it can be appreciated that there exists a continuing need for a new and improved portable radial drill press which can be used for providing an upstanding adjustable support arm that has a two part articulatable drill support structure that extends from the upstanding support arm. In this regard, the present invention substantially fulfills this need.

SUMMARY OF THE INVENTION

In view of the foregoing disadvantages inherent in the known types of drill press stands now present in the prior art, the present invention provides an improved portable radial drill press. As such, the general purpose of the present invention, which will be described subsequently in greater detail, is to provide a new and improved portable radial drill press and method which has all the advantages of the prior art and none of the disadvantages.

To attain this, the present invention essentially comprises a generally L-shaped base member that is secured to a receiving surface. The base member has an columnar support with a balance retention member interconnected. The balance retention member projects outwardly from a front side of the columnar support. The balance retention member has a generally rectangular opening. The columnar support has a first cylindrical axial bore extending a width of the columnar member. The columnar support has a back side with a vertical slit having a width equal to the width of the first bore. A traveling block is provided. The traveling block has a rear support with forked members that extend outwardly. The rear support has a second cylindrical axial bore extending a width of the traveling block. Included is a cylindrical columnar member for positioning within the first axial bore of the base member. The columnar member has a top end, a bottom portion and a middle portion. The top end is passed into the second axial bore of the traveling block. The columnar member has a front keyway and a rear keyway with each passing through a peripheral wall of the columnar member. Each keyway extends about 85 percent of a length of the middle portion of the columnar member. The bottom portion is secured within the first axial bore with a clamping bolt. The clamping bolt is capable of closing the slit of the columnar support. The columnar member has ball bearings therein and adjacent the top end. Also, an elongated left hand feed screw is positioned within the columnar member. The feed screw has an allen head bolt secured thereto. The allen head bolt has a screw head and a neck portion engaging the ball bearings of the columnar member. The feed screw is slidably received within the columnar member and secured to the allen head bolt. The feed screw is slidably received within the columnar member while the screw head remains exterior. The feed screw is threadably engaged by a feed nut screw within the columnar member. The feed nut screw is held in position, about the feed screw, by a first bolt and a flat screw. The feed screw is rotated by an allen wrench that engages the screw head. Engagement by the allen wrench allows the feed nut to moving up and down within the columnar support. Additionally, the first bolt is passed between the fork members of the traveling block and through the front keyway to engage the feed nut screw. The flat screw is passed through the rear support of the traveling block and through the rear keyway to engage the feed nut screw. The traveling block traverses the columnar member up and down when secured to the feed nut screw by the first bolt and flat screw. Lastly, a drill support arm, with a generally rectangular shape, is provided. The drill support arm has an elongated opening, a large opening and a slot. The elongated opening is spaced from a rear edge. The large opening is near a front edge. The drill support arm is coupled to the travel block with a second bolt that is passed vertically through the forked members and the elongated opening. The elongated opening slidably engages the second bolt when positioned between the forked members of the travel block. The drill support arm has a drill end of a hand held drill positioned through the large opening. Furthermore, the drill end is locked within the large opening by a tap screw. The tap screw is passed through the slot of the drill support arm. The drill support arm supports the drill while being received between the forked members of the travel block being engaged by the feed screw. The drill support arm moves up and down with the traveling block for varying the height of the drill over the object being worked.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved portable radial drill press which has all of the advantages of the prior art drill press stands and none of the disadvantages.

It is another object of the present invention to provide a new and improved portable radial drill press which may be easily and efficiently manufactured and marketed.

It is further object of the present invention to provide a new and improved portable radial drill press which is of durable and reliable constructions.

An even further object of the present invention is to provide a new and improved portable radial drill press which is susceptible of a low cost of manufacture with regard to both materials and labor, and which accordingly is then susceptible of low prices of sale to the consuming public, thereby making such portable radial drill press economically available to the buying public.

Still yet another object of the present invention is to provide a new and improved portable radial drill press which provides in the apparatuses and methods of the prior art some of the advantages thereof, while simultaneously overcoming some of the disadvantages normally associated therewith.

Even still another object of the present invention is to provide a portable radial drill press for providing an upstanding adjustable support arm that has a two part articulatable drill support structure that extends from the upstanding support arm.

Lastly, it is an object of the present invention to provide a new and improved portable radial drill press including a base member that has a columnar support with a balance retention member interconnected thereto. The columnar support has a first axial bore and a back side with a vertical slit. Included is a traveling block has a rear support with a second axial bore and forked members. A cylindrical columnar member is positioned within the first axial bore of the base member. The columnar member has a top end that passes into the second axial bore of the traveling block. The columnar member has a bottom portion secured within the first axial bore with a clamping bolt. An elongated left hand feed screw is positioned within the columnar member and engaged by a feed nut screw. The feed nut screw is held about the feed screw by a first bolt and a flat screw. The first bolt passes between the fork members of the traveling block to engage the feed nut screw. The flat screw passes through the rear support of the traveling block to engage the feed nut screw. The traveling block traverses the columnar member up and down when secured to the feed nut screw by the first bolt and flat screw. Lastly, a drill support arm with an elongated opening and large opening is included. The elongated opening allows coupling of the support arm to the traveling block between the forked members. The large opening having a drill end of a hand held drill positioned therethrough for use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a sectional view of the top of present invention showing the engagement of the feed screw and the ball bearings.

FIG. 6 is an isometric view of columnar member engaging the base member of the present invention in an operable configuration.

The same reference numerals refer to the same parts through the various Figures.

DESCRIPTION OF THE PREFERRED EMBODIMENT

Figure 1:
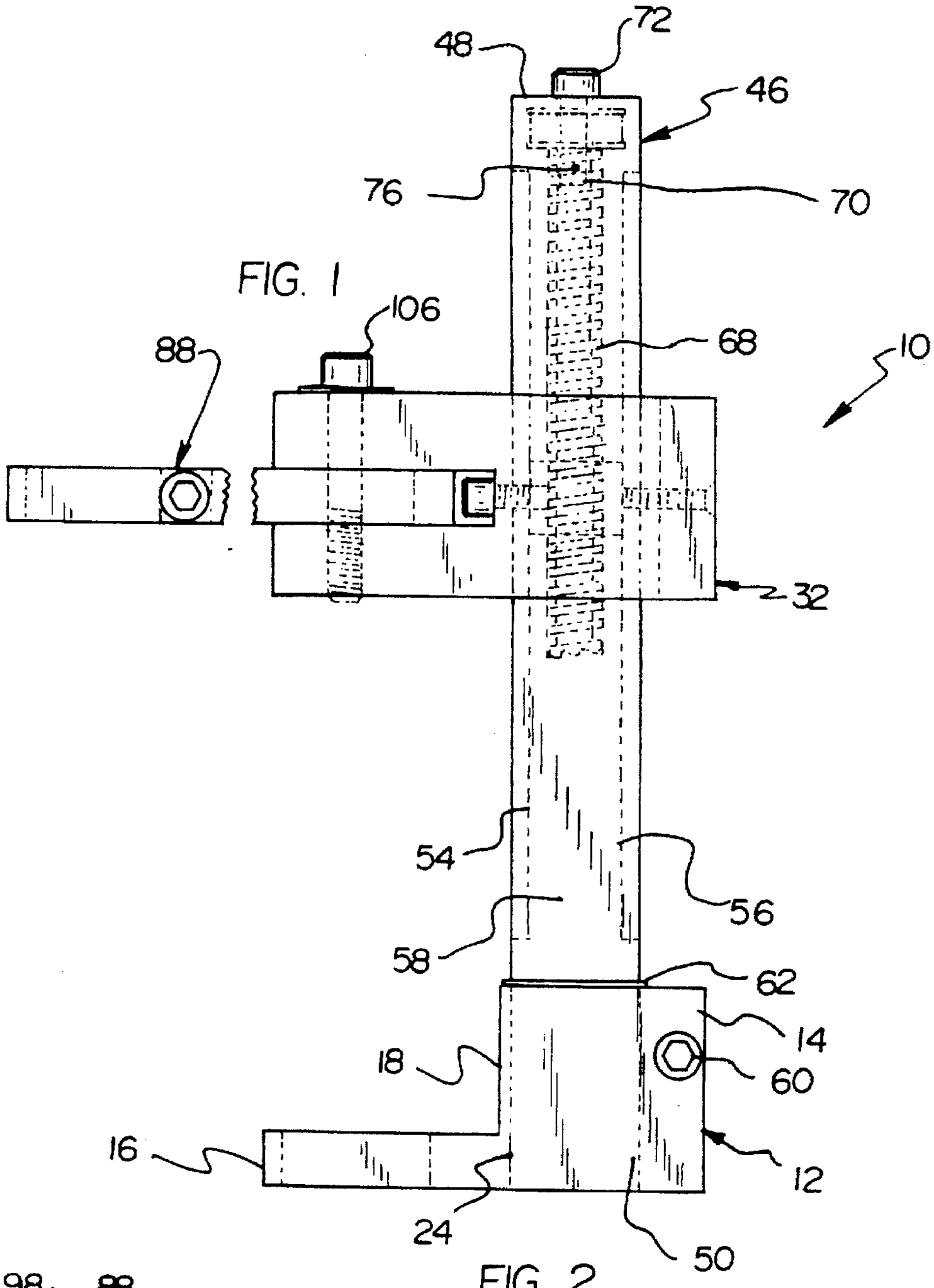
FIG. 1 is a perspective view of the preferred embodiment of the portable radial drill press constructed in accordance with the principles of the present invention.
Figure 2:
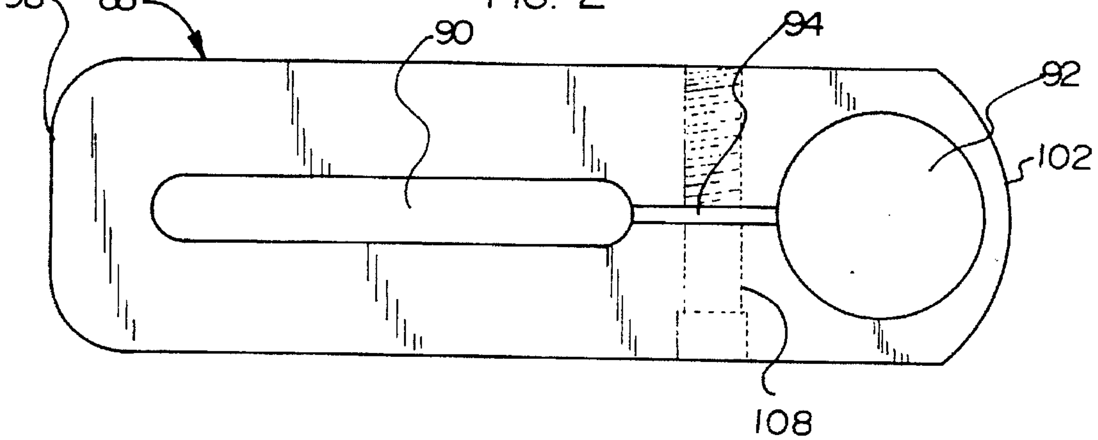
FIG. 2 is a top plan view of the drill support arm of the present invention.
Figure 3:
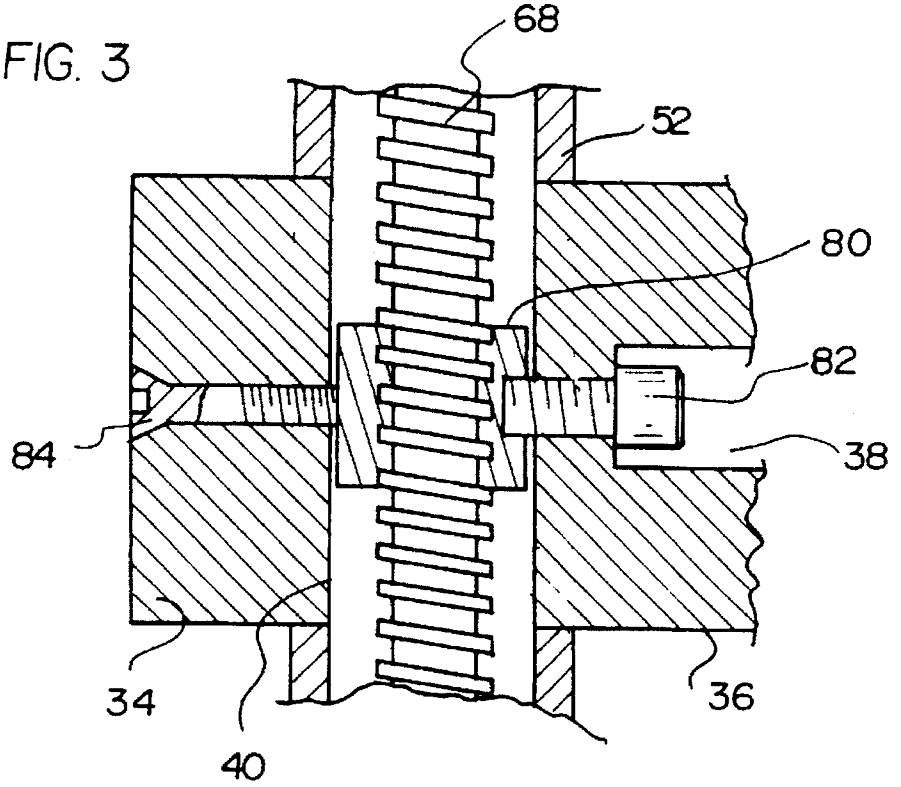
FIG. 3 is a fragmented cross sectional view of the feed nut screw engaging the feed nut of the present invention.

With reference now to the drawings, and in particular to FIG. 1 thereof, the preferred embodiment of the new and improved portable radial drill press embodying the principles and concepts of the present invention and generally designated by the reference numeral 10 will be described.

The present invention, the portable radial drill press 10 is comprised of a plurality of components. Such components in their broadest context include a base, a columnar member, a feed screw, a traveling block and a drill support arm. Such components are individually configured and correlated with respect to each other so as to attain the desired objective.

Figure 4:
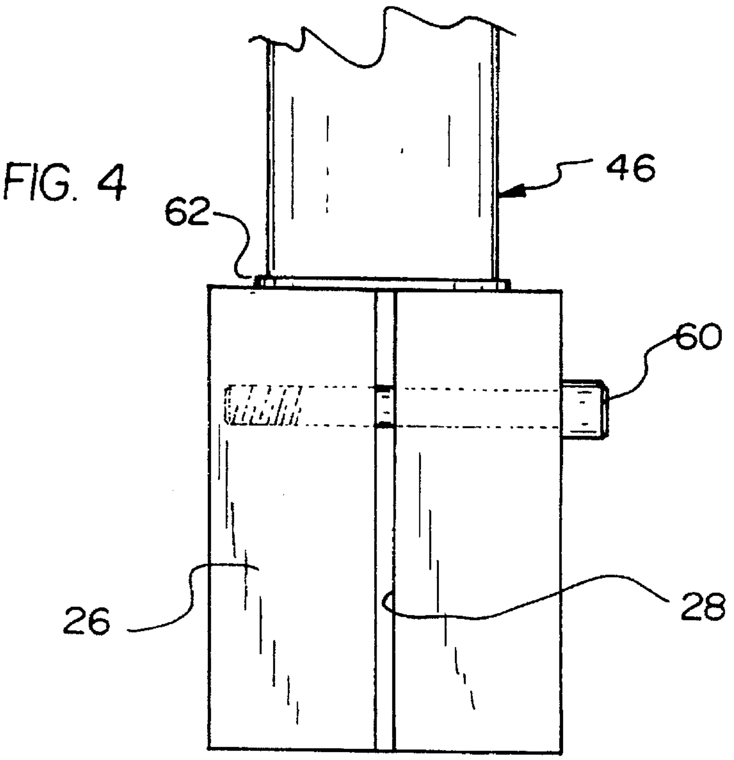
FIG. 4 is a fragmentary rear view of the present invention of FIG. 1.

Specifically, the present invention includes a generally L-shaped base member 12 that is secured to a receiving surface. The base is a rigid solid material, such a plastic or steel. The base member may be secured to any receiving surface in any position. The base member has an columnar support 14 with a balance retention member 16 interconnected, as seen in FIG. 6. The balance retention member projects outwardly from a front side 18 of the columnar support. The balance retention member has a generally rectangular opening 20. The columnar support has a first cylindrical axial bore 24. As seen in FIG. 6, the first axial bore extends a width of the columnar member. The columnar support has a back side 26 with a vertical slit 28. As shown in FIG. 4, the vertical slit has a slit height equal to the width of the first bore. The base member is secured to the receiving surface by a unshown C-clamp or a bolt through the rectangular opening 20.

A best illustrated in FIG. 1, a traveling block 32 is provided. The travel block is formed of aluminum. The traveling block has a rear support 34 with forked members 36 that extend outwardly. Each forked member being about 1 inch thick, with the gap 38 between the forked members being about ¾ inch. The rear support has a second cylindrical axial bore 40 extending a width of the traveling block.

Included is a cylindrical columnar member 46 for positioning within the first axial bore 24 of the base member. The columnar member is a hollow steel tube The columnar member has a top end 48, a bottom portion 50 and a middle portion 52. The top end is passed into the second axial bore 40 of the traveling block, and allows the traveling block to rest about the middle portion. The columnar member has a front keyway 54 and a rear keyway 56 passing through a peripheral wall 58 of the columnar member. As shown in FIG. 1, each keyway extends about 85 percent of a length of the middle portion of the columnar member. Each keyway leave about 1 inch from the top end and 2½ inches from an end of the bottom portion. Each keyway has a diameter of about ½ inch.

The bottom portion 50 of the columnar member is secured within the first axial bore 24 with a clamping bolt 60. A snap ring 62, as seen in FIG. 4, aids in the coupling of the bottom portion within the columnar support. The bottom portion of the columnar member may be rotated 360 degrees within the columnar support. The clamping bolt is capable of closing the slit of the columnar support, when turned by an allen wrench. The travel block may be faced in a variety of directions as the columnar member is rotated within the columnar support. The direction of the travel block is locked in place when the clamp locks the columnar member in position.

The columnar member has ball bearings 64 therein and adjacent the top end. The ball bearings are secured within the columnar member by a pair of snap rings 66.

Also, an elongated left hand feed screw 68 is positioned within the columnar member 46. The feed screw has an allen head bolt 70 secured thereto. The allen head bolt has a screw head 72 and a neck portion 74 engaging the ball bearings 64 of the columnar member. The feed screw is a ¾ diameter, 5 pitch left handed screw. The feed screw is slidably received within the columnar member and secured to the allen head bolt by a roll pin 76. The screw head of the allen head bolt remains exterior the columnar member. The feed screw is threadably engaged by a feed nut screw 80 within the columnar member. The feed nut screw is held in position, about the feed screw, by a first bolt 82 and a flat screw 84. The feed screw is rotated by an allen wrench 86 that engages the screw head of the allen head bolt. Engagement, of the feed screw by the allen wrench, allows the feed nut to moving up and down within the columnar member.

Additionally, the first bolt 82 is passed between the fork members and within the gap 38 of the traveling block. The first bolt then passes through the front keyway 54, as seen in FIG. 1, to engage the feed nut screw. The flat screw 84 is passed through the rear support 34 of the traveling block, then through the rear keyway 56 to engage the feed nut screw. The traveling block traverses the columnar member up and down when secured to the feed nut screw 80 by the first bolt and flat screw.

Lastly, a drill support arm 88, with a generally rectangular shape, is provided. The drill support arm is made from aluminum. The drill support arm has an elongated opening 90, a large opening 92 and a slot 94. The elongated opening is spaced from a rear edge 98. The large opening is near a front edge 102. The drill support arm is coupled to the travel block with a second bolt 106 that is passed vertically through the forked members 36 and the elongated opening. The elongated opening, as seen in FIG. 1, slidably engages the second bolt when positioned between the forked members of the travel block. The drill support arm is able to swing 180 degrees about the second bolt between the forked members.

Furthermore, the drill support arm 88 may have a drill end of a hand held drill positioned through the large opening 92. The drill end is locked within the large opening by a tap screw 108. The tap screw is passed through the slot of the drill support arm. The drill support arm supports the drill while, when received between the forked members of the travel block, and the travel block is engaged by the feed screw. The drill support arm moves up and down with the traveling block for varying the height of the drill over the object being worked.

In use, the base 12 may be secured to a work bench or the item to be drilled, by the C-clamp. The columnar member is adjusted to a desired angle of the drill by turning it within the columnar support. The feed screw is supported within the center of the columnar member with the ball bearing to accept the downward thrust while feeding the drill into the work material. Next, the height of the traveling block is adjusted by rotating the feed screw within the columnar member. Once these things are in position, the hand-held drill may be placed through the large opening of the drill support arm. The drill end of the hand-held drill may be secured within the drill support arm by adjusting the tap screw of the slot.

When the invention is adjusted in this fashion, the drill is set to drill directly into the object that is being worked with. In another instance, the hand-held drill may be positioned within the drill support arm and lowered by the rotation of the adjustment screw with the allen wrench.

The present invention is a portable drill press that is much more portable than most drill presses. The portable radial drill press of the present invention provides an easy to use drill bit press that can be used in any position, vertical, horizontal or overhead. In using the present invention, one only needs a small space so as to attach the base with a C-clamp to either the object being drilled or a support structure. The base of the present invention may be attached to any surface, the surface need not be a balance surface in order for you to obtain a straight drill hole. The height of the present invention from the base to the top end of the columnar member is about 16 inches. The width of the base member is 12 inches, and the width of the base is 3 inches. Very little effort is require to use the present invention because the drill press is feed with lead screws in the center of the columnar instead of the conventional rack and pinion method. This device will drill straight holes so they may be tapped for bolts to be inserted from any direction.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved portable radial drill press for supporting a drill while being operated comprising in combination:

a generally L-shaped base member capable of being secured to a receiving surface, the base member having an columnar support with a balance retention member interconnected thereto, the balance retention member projecting outwardly from a front side of the columnar support, the balance retention member having a generally rectangular opening therethrough, the columnar support having a first cylindrical axial bore extending a width thereof, the columnar support having a back side with a vertical slit having a slit height equal to the width of the first bore;

a traveling block having a rear support with forked members extending outwardly therefrom, the rear support having a second cylindrical axial bore extending a width thereof;

a cylindrical columnar member for positioning within the first axial bore of the base member, the columnar member having a top end, a bottom portion and a middle portion therebetween, the top end being capable of passing into the second axial bore of the traveling block, the columnar member having a front keyway and a rear keyway passing through a peripheral wall of the columnar member, each keyway extending about 85 percent of a length of the middle portion of the columnar member, the bottom portion being secured within the first axial bore with a clamping bolt being capable of closing the slit of the columnar support, the columnar member having ball bearings therein and adjacent the top end;

an elongated left hand feed screw being positionable within the columnar member, the feed screw has an allen head bolt secured thereto, the allen head bolt has a screw head and a neck portion engaging the ball bearings of the columnar member, the feed screw is slidably received within the columnar member and secured to the allen head bolt, the feed screw capable of being slidably received within the columnar member while the screw head remains exterior thereto, the feed screw being threadably engaged by a feed nut screw within the columnar member, the feed nut screw being held in position about the feed screw by a first bolt and a flat screw, the feed screw being rotated by an allen wrench engaging the screw head of the allen head bolt and allowing the feed nut screw to move up and down about the feed screw and within the columnar support;

the first bolt being passed between the fork members of the traveling block and through the front keyway to engage the feed nut screw, the flat screw passes through the rear support of the traveling block and through the rear keyway to engage the feed nut screw, the traveling block being capable of traversing the columnar member up and down when secured to the feed nut screw by the first bolt and flat screw;

a drill support arm having a generally rectangular shape, the drill support arm having an elongated opening, a large opening and a slot therebetween, the drill support arm has a front edge and a rear edge, the elongated opening being spaced from the rear edge with the large opening being near the front edge, the drill support arm being coupled to the travel block with a second bolt passing vertically through the forked members and the elongated opening, the elongated opening slidably engages the second bolt when positioned between the forked members of the travel block, the drill support arm being capable of having a drill end of a hand held drill positioned through the large opening; and the drill end of the hand held drill being locked within the large opening of the drill support arm by a tap screw being passed through the slot of the drill support arm, the drill support arm supporting the drill while being received between the forked members of the travel block being engaged by the feed screw, the drill support arm capable of being moved up and down with the movement of the traveling block for varying the height of the drill over an object being worked.

2. A portable radial drill press comprising:

a base member having a columnar support with a balance retention member interconnected thereto, the columnar support having a first cylindrical axial bore and a back side with a vertical slit;

a traveling block having a rear support with a second cylindrical axial bore, and forked members extending outwardly therefrom;

a cylindrical columnar member for positioning within the first axial bore of the base member, the columnar member having a top end being capable of passing into the second axial bore of the traveling block, the columnar member having a bottom portion being secured within the first axial bore with a clamping bolt;

an elongated left hand feed screw positionable within the columnar member and engaged by a feed nut screw within, the feed nut screw being held about the feed screw by a first bolt and a flat screw, the first bolt passes between the fork members of the traveling block to engage the feed nut screw, the flat screw passes through the rear support of the traveling block to engage the feed nut screw, the traveling block being capable of traversing the columnar member up and down when secured to the feed nut screw by the first bolt and flat screw;

a drill support arm having an elongated opening and large opening, the elongated opening allowing coupling of the support arm to the traveling block between the forked members, the large opening having a drill end of a hand held drill positioned therethrough for use;

a second bolt passes vertically through the forked members and the elongated opening of the drill support arm, the elongated opening slidably engages the second bolt when positioned between the forked members of the travel block; and the elongated opening and the large opening having a slot therebetween, the slot of the drill support arm capable of receiving a tap screw for locking the drill end within the large opening, and the drill support arm supporting the drill while being received between the forked members of the travel block being engaged by the feed screw, the drill support arm capable of being moved up and down with the traveling block for varying the height of the drill over an object being worked.

* * * * *